(12) United States Patent
Wan et al.

(10) Patent No.: US 9,781,575 B1
(45) Date of Patent: Oct. 3, 2017

(54) AUTONOMOUS SEMANTIC LABELING OF PHYSICAL LOCATIONS

(71) Applicant: Intel Corporation, Santa Clara, CA (US)

(72) Inventors: Chieh-Yih Wan, Beaverton, OR (US);
Lei Yang, Hillsboro, OR (US);
Jonathan J. Huang, Pleasanton, CA (US); Hong Lu, Santa Clara, CA (US);
Rahul C. Shah, San Francisco, CA (US); Lama Nachman, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 6 days.

(21) Appl. No.: 15/084,799

(22) Filed: Mar. 30, 2016

(51) Int. Cl.
*H04W 4/04* (2009.01)
*H04W 4/00* (2009.01)
(Continued)

(52) U.S. Cl.
CPC ............ *H04W 4/04* (2013.01); *H04L 67/303* (2013.01); *H04W 4/005* (2013.01); *H04W 4/008* (2013.01); *H04W 4/023* (2013.01)

(58) Field of Classification Search
CPC   H04B 10/1149; H04B 17/318; H04B 5/0043; H04W 4/4005; H04W 4/043;
(Continued)

(56) References Cited

U.S. PATENT DOCUMENTS

| 8,745,250 B2 | 6/2014 | Shah et al. |
| 2003/0008668 A1 | 1/2003 | Perez-Breva et al. |

(Continued)

OTHER PUBLICATIONS

Bolliger, Phillip; "Redpin—adaptive, zero-configuration indoor localization through user collaboration"; In Proceedings of the first ACM International workshop on Mobile entity localization and tracking in GPS-less environments, MELT '08, Sep. 19, 2008, 6 pages.

(Continued)

*Primary Examiner* — Nizar Sivji
(74) *Attorney, Agent, or Firm* — Grossman, Tucker, Perreault & Pfleger, PLLC

(57) ABSTRACT

A portable electronic device may generate a (RF) radio frequency fingerprint that includes information representative of at least a portion of RF signals received at a given physical location. The RF fingerprint may include, for example, a unique identifier and a signal strength that are both logically associated with at least a portion of the received RF signals. The portable electronic device may also receive data representative of a number of environmental parameters about the portable electronic device. These environmental parameters may be measured using sensors carried by the portable electronic device. Considered in combination, these environmental parameters provide an environmental signature for a given location. When combined into a data cluster, the RF fingerprint and the environmental signature may provide an indication of the physical subdivision where the portable electronic device is located. The portable electronic device may then generate a proposed semantic label for the physical subdivision.

25 Claims, 7 Drawing Sheets

(51) Int. Cl.
*H04L 29/08* (2006.01)
*H04W 4/02* (2009.01)

(58) Field of Classification Search
CPC ....... H04W 4/025; H04W 4/021; H04W 4/02;
H04W 4/04; H04W 4/008; H04L 67/303;
H04L 12/282; H04L 67/22; G01C 21/206;
G01C 21/005; G01S 5/0284; G01S 5/08;
H04N 5/144
See application file for complete search history.

(56) References Cited

U.S. PATENT DOCUMENTS

| | | | |
|---|---|---|---|
| 2005/0035846 A1* | 2/2005 | Zigmond | G08C 17/02 340/5.22 |
| 2013/0184007 A1 | 7/2013 | Hategan et al. | |
| 2016/0021494 A1* | 1/2016 | Yang | H04W 4/02 455/41.2 |
| 2016/0238690 A1* | 8/2016 | Colucci | G01S 1/68 |
| 2017/0013409 A1* | 1/2017 | Cerchio | H04W 4/025 |
| 2017/0122744 A1* | 5/2017 | Long | G01C 21/206 |

OTHER PUBLICATIONS

Azizyan, et al.; "SurroundSense: Mobile Phone Localization via Ambience Fingerprinting"; MobiCom '09, Sep. 20-25, 2009, 12 pages.
Park, et al.; "Growing an Organic Indoor Location System"; MobiSys '10, Jun. 15-18, 2010, 14 pages.
Dehak, et al.; "Front-End Factor Analysis for Speaker Verification"; IEEE Transactions on Audio, Speech, and Language Processing, vol. 19, No. 4, May 2011, pp. 788-798.
Tarzia, et al.; "Indoor Localization without Infrastructure using the Acoustic Background Spectrum"; MobiSys '11, Jun. 28-Jul. 1, 2011, 14 pages.
Yu, et al.; "Improved Bottleneck Features Using Pretrained Deep Neural Networks"; Interspeech 2011, Aug. 28-31, 2011, pp. 237-240.
Wu, et al.; "WILL: Wireless Indoor Localization Without Site Survey"; INFOCOM, Mar. 27, 2012, 34 pages.
Wang, et al.; "No Need to War-Drive: Unsupervised Indoor Localization" ACM MobiSys 2012, Jun. 25, 2012, 24 pages.
Jiang, et al.; "ARIEL: Automatic Wi-Fi based Room Fingerprinting for Indoor Localization"; UbiComp '12, Sep. 5-8, 2012, pp. 441-450.
Biehl, et al.; "LoCo: A Ready-to-Deploy Framework for Efficient Room Localization using Wi-Fi"; Ubicomp '14, Sep. 13-17, 2014, 5 pages.
Shin, et al.; "Wi-Fi Fingerprint-Based Topological Map Building for Indoor User Tracking"; Embedded and Real-Time computing Systems and Applications (RTCSA), 2010 IEEE 16th International Conference on Embedded Real-Time computing Systems and Applications; Aug. 23-25, 2010; pp. 105-113.
Mozos, Oscar Martinez, et al: "Supervised semantic labeling of places using information extracted from sensor data", Robotics and Autonomous Systems, vol. 55, Issue 5, pp. 391-402, May 31, 2007. (www.sciencedirect.com/science/article/pii/S092188900600103X).
Rishabh, Ish, et al.: "Indoor localization using controlled ambient sounds", 2012 International Conference on Indoor Positioning and Indoor Navigation (IPIN), Jan. 24, 2013, 11 pages.
Tejada, Carlos E. Galvan, et al.: "Multivariate or Univariate Model Analysis for Indoor Location Systems: A Comparison", ResearchGate, Mar. 3, 2016, 6 pages.
International Search Report and Written Opinion issued in PCT Application No. PCT/US2017/015570, dated May 8, 2017, 17 pages.

\* cited by examiner

AUTONOMOUS SEMANTIC LABELING OF PHYSICAL LOCATIONS

TECHNICAL FIELD

The present disclosure relates to autonomous location detection for portable devices.

BACKGROUND

Currently, many portable electronic devices use absolute location or geocoordinates determined or otherwise calculated using traditional IEEE 802.11 (WiFi®) location services. These techniques usually derive device location using trilateration based on a received signal strength indicator (RSSI) propagation model, a WiFi time-of-flight (ToF), or by compiling a set of RSSIs from a number of different WiFi sources as a location signature (e.g., RSSI fingerprinting). Some of the solutions permit the user of the portable electronic device to enter or otherwise input semantic labels (e.g., indoor locations at a room level) that are then logically associated with a respective location.

A typical approach may include collecting WiFi samples at a number of locations within each room or semantic location followed by applying a supervised classification algorithm to map a new WiFi measurement to the trained hotspots. Such existing solutions are tedious, requiring the portable electronic device user to manually train a room or semantic classifier to create a WiFi database that maps a particular signature to a particular semantic or room location. Such a system is labor-intensive and requires periodic maintenance when the room environment changes.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
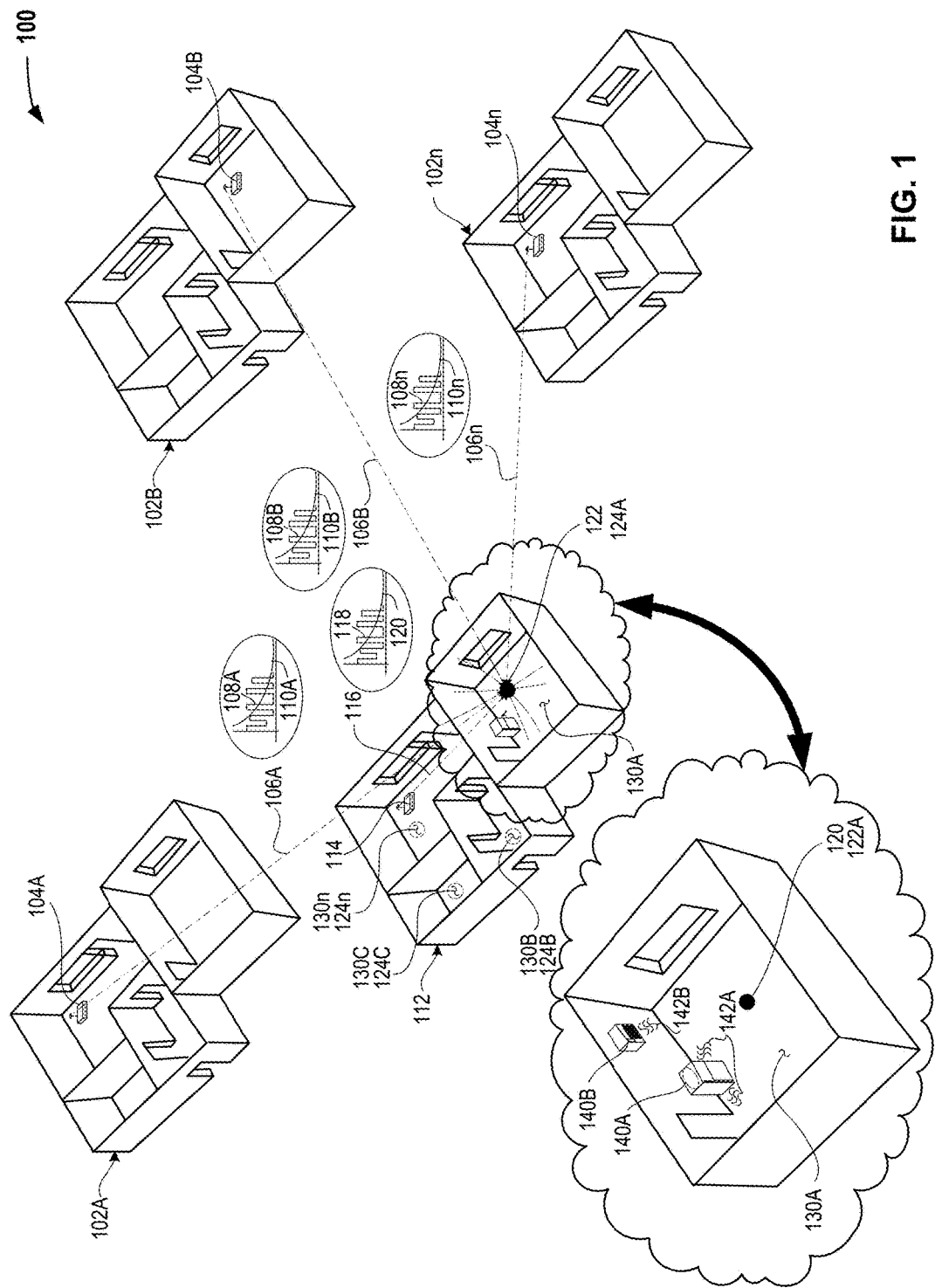
FIG. 1 provides a schematic of an illustrative autonomous semantic labeling system, in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The systems and methods disclosed herein provide solutions that automatically learn the semantic labels that are logically associated with physical locations in an indoor environment. Such physical locations may include rooms or similar divisible sub-structures existing within a larger structure or may include sub-portions of a larger area such as a sub portion of gymnasium or similar large, open, structure having few, if any, internal dividers. The systems and methods disclosed herein propose semantic labeling for physical locations without requiring any explicit user training. Such systems and methods beneficially and advantageously provide a smooth user experience that incorporates location aware technology on a day-to-day basis.

Such semantic labeling of physical locations offers significant benefits over current state-of-the-art systems. For example, such systems and methods may provide parental control in a home environment where a portable electronic device may automatically switch between device profiles simply by recognizing a physical location such as the master bedroom, living room, or children's bedroom. In another example, such systems and methods may be useful for sleep monitoring by tracking locations where the device user sleeps and providing feedback on the quality of the user's sleep by location. In another example, such systems and methods may be used for elder care by tracking where elders spend time to develop an understanding of the elder's daily routine such as meals, bathroom activity, and entertainment. Such may permit the detection of unhealthy trends and emergencies.

Instead of requiring the user of the portable electronic device to manually collect and label WiFi training data in each room, the systems and methods described herein leverage WiFi data collected in the background during the day-to-day activity of the user. The systems and methods described herein automatically group or cluster the WiFi signals into virtual rooms in a WiFi signal space that may be mapped into physical rooms via a simplified user annotation process. The systems and methods described herein may employ data collected from one or more sensors carried by the portable electronic device to infer user activity and filter data based on a motion state of a user to reduce WiFi signal noise and accommodate routine fluctuations in WiFi signals. Additionally, such user mobility data may be used to adjust the sampling frequency of WiFi data, identify personally significant places by user, and determine optimal times to opportunistically collect device user feedback. For example, the WiFi sampling frequency may be reduced when device sensor data indicates the user is stationary—such may reduce the collection of redundant data at a single location.

In another example, WiFi data collected when device sensor data indicates the user is in motion may be discarded since such data is typically collected when the user is in transition between rooms. In embodiments, the filtered WiFi data may be buffered in the portable electronic device memory until the data size exceeds a defined threshold. When the collected data exceeds the threshold value, an unsupervised clustering process may be applied to the collected WiFi data to form logical clusters and virtual rooms.

Once the user of the portable electronic device is determined to be stationary (i.e., remaining in the same location for greater than a defined time), the systems and methods described herein would opportunistically and autonomously prompt the user to provide feedback. Such feedback may be used to label the current virtual room with a semantic label, confirm the system has autonomously assigned a correct semantic label to the current virtual room, or to correct and retrain the system when the system has autonomously assigned an incorrect semantic label to the current virtual room. Such device user feedback may beneficially be used to training feedback for the classification state machine as well as ground truth to evaluate the performance of the classification state machine. A high performance state machine may be used to automatically merge newly found data clusters or virtual rooms with known or previously labeled physical rooms in the absence of user feedback. For example, if a WiFi fingerprint in a virtual room may be classified with a high confidence as a known physical room, then the virtual room can share the room label and be mapped to the corresponding physical room.

The systems and methods beneficially fuses data from sensors frequently carried by portable electronic devices (e.g., audio sensors, accelerometers) to augment the WiFi data in capturing the context representation of a room and leverage that to automatically propagate labels or merge rooms. For example, an ambient audio profile of a room is likely to be unique across different rooms and may be used as a signature to identify physical rooms. Newly found virtual rooms that share the same audio signature with a physical room may then be merged or labeled automatically without user input. Similarly, fusing accelerometer data, different virtual rooms detected during the period of time when the portable electronic device is stationary may be merged automatically, or even labeled accordingly if the stationary time window overlaps with the detection of a physical room with high confidence.

A portable electronic device is provided. The portable electronic device may include a transceiver that, in operation, receives a plurality of radio frequency (RF) signals within a defined portion of the RF spectrum, a sensor, and a circuit communicably coupled to the transceiver and to the sensor. The portable electronic device further includes a storage device communicably coupled to the circuit, the storage device to store machine readable instructions that, when executed by the at least one circuit, cause the at least one circuit to provide a semantic labeling controller. The semantic labeling controller selectively generates at least one RF fingerprint using at least one parameter from each of the plurality of received RF signals; receives from the sensor at least one output signal that includes data or information indicative of a physical subdivision external to the portable electronic device; selectively generates at least one environmental signature using at least one parameter from the at least one sensor output signal; selectively groups data representative of the at least one RF fingerprint and the data or information representative of the at least one environmental signature into a data cluster responsive to the RF fingerprint meeting at least one threshold criteria; and autonomously proposes a semantic label for logical association with a physical subdivision based at least in part on the RF fingerprint and the environmental signature.

A portable electronic device controller is also provided. The controller may include a circuit communicably coupleable to a radio frequency (RF) transceiver and to a sensor that generates a signal that includes data or information indicative of an ambient environment in a physical subdivision about the circuit and a storage device communicably coupled to the circuit, the storage device to store machine readable instructions that, when executed by the at least one circuit, cause the at least one circuit to provide a semantic labeling controller. The semantic labeling controller may selectively generate at least one RF fingerprint using at least one parameter from each of the plurality of received RF signals; receive from the sensor at least one output signal that includes data or information indicative of a physical subdivision external to the portable electronic device; selectively generate at least one environmental signature using at least one parameter from the at least one sensor output signal;
selectively group data representative of the at least one RF fingerprint and the data or information representative of the at least one environmental signature into a data cluster responsive to the RF fingerprint meeting at least one threshold criteria; and autonomously proposes a semantic label for logical association with a physical subdivision based at least in part on the RF fingerprint and the environmental signature.

An autonomous semantic labeling method is provided. The method may include selectively generating, by a semantic labeling controller, at least one radio frequency (RF) fingerprint using at least one parameter from each of the plurality of received RF signals; receiving, by the semantic labeling controller from a communicably coupled sensor, at least one output signal that includes data or information indicative of a physical subdivision external to a portable electronic device; selectively generating, by the semantic labeling controller, at least one environmental signature using at least one parameter from the at least one sensor output signal; selectively grouping, by the semantic labeling controller, data representative of the at least one RF fingerprint and the data or information representative of the at least one environmental signature into a data cluster responsive to the RF fingerprint meeting at least one threshold criteria; and autonomously proposing, by the semantic labeling controller, a semantic label for logical association with a physical subdivision based at least in part on the RF fingerprint and the environmental signature.

An autonomous semantic labeling system is provided. The system may include a means for selectively generating at least one radio frequency (RF) fingerprint using at least one parameter from each of the plurality of received RF signals; a means for receiving at least one output signal that includes data or information indicative of a physical subdivision external to a portable electronic device; a means for selectively generating at least one environmental signature using at least one parameter from the at least one sensor output signal; a means for selectively grouping data representative of the at least one RF fingerprint and the data or information representative of the at least one environmental signature into a data cluster responsive to the RF fingerprint meeting at least one threshold criteria; and a means for autonomously proposing a semantic label for logical association with a physical subdivision based at least in part on the RF fingerprint and the environmental signature.

A storage device is provided. The storage device may include machine-readable instructions that, when executed by a circuit, cause the circuit to provide a semantic labeling controller, that selectively generates at least one RF fingerprint using at least one parameter from each of the plurality of received RF signals; receives from the sensor at least one output signal that includes data or information indicative of a physical subdivision external to the portable electronic device; selectively generates at least one environmental signature using at least one parameter from the at least one sensor output signal; selectively groups data representative of the at least one RF fingerprint and the data or information representative of the at least one environmental signature into a data cluster responsive to the RF fingerprint meeting at least one threshold criteria; and autonomously proposes a semantic label for logical association with a physical subdivision based at least in part on the RF fingerprint and the environmental signature.

FIG. 1 provides a schematic of an illustrative autonomous location detection and semantic labeling system 100, in accordance with at least one embodiment of the present disclosure. In embodiments, a number of radio frequency (RF) transmitters 104A-104n (collectively, "RF transmitters 104") may each be located in one of a respective number of locations 102A-102n (collectively "locations 102"). Each RF transmitter 104A-104n generates a respective RF signal 106A-106n (collectively "RF signal 106") that includes a respective unique identifier 108A-108n and has a signal strength 110A-110n (collectively "signal strength 110") that varies inversely with the square of the distance from the originating RF transmitter 104. A portable electronic device 122, such as a smartphone or similar portable, processor-based, computing device may be disposed at a location 124A at a location 112 that is different from, but in the vicinity of, the locations 102. For example, the portable electronic device 120 may be disposed in one room 130A of a structure 112 that includes a number of subdivisions 130A-130n (collectively "subdivisions 130"), such as rooms, offices, conference rooms, etc., that may be separated by full- or partial-height partitions, walls, or other similar dividers. In some implementations, an RF device 114 may be disposed in a different room 130n within the structure 112.

The portable electronic device 122 may be located at a physical location 124A, for example in subdivision 130A of structure 112. At physical location 124A places the portable electronic device a distance from each of RF devices 104A-104n. At physical location 124A, the unique identifiers 108A-108n and the signal strengths 110A-110n of RF signals 106A-106n and the unique identifier 118 and the signal strength 120 of RF signal 116 form a data set or data cluster that contains a number of values or an "RF fingerprint" unique to physical location 124A. In a like manner, ANY physical location 124A-n within the system 100 may be identified by a unique RF fingerprint.

As the portable electronic device 122 is moved to different physical locations (e.g., different subdivisions 130A-130n) in the structure 112, the RF fingerprint (i.e., the data set containing the unique identifier and signal strength of each RF signal 104A-104n and 114) at the portable electronic device will change. Indeed, as the portable electronic device 120 moves about a single subdivision 130 within a structure 112, the RF fingerprint detected by the portable electronic device 122 will change. Such variances in RF fingerprints make mapping the extent of a single subdivision 130 difficult, tedious, and time consuming.

In implementations, the portable electronic device 122 may include a number of sensors. The sensors carried by the portable electronic device 122 may collect information about all or a portion of the external or ambient environment about the portable electronic device 122. Such information may include, but is not limited to, an ambient audio level in the environment, an ambient light level in the environment, a movement of the portable electronic device in the environment, and/or one or more images of the environment. In implementations, the sensors carried by the portable electronic device 122 may provide a respective output signal that includes data or information representative of one or more aspects of the ambient environment about the portable electronic device 122.

In implementations, each subdivision 130 within structure 112 may include elements 140 that uniquely characterize and/or identify the ambient environment within the respective subdivision 130. Each of these elements 140 may include one or more environmental signatures 142A-142n (collectively "environmental signature 142") that characterize the element 140 and which may assist in identification of the subdivision 130. These environmental signatures 142 may include unique colors, unique shapes, unique sounds, or combinations thereof. For example, a subdivision 130, such as a kitchen, may include various appliances (e.g., refrigerator 140A, air conditioner 140B, garbage disposal 140n) that produce a recognizable, reproducible, and identifiable environmental signature 142A-142n. In such instances, an audio sensor carried by the portable electronic device 122 may capture data or information capable of characterizing a particular subdivision 130 within the structure 112. For example, a microphone carried by the portable electronic device 122 may output an audio signal that includes data or information representative of the characteristic audio of a refrigerator running or a garbage disposal in operation in a subdivision 130 such as a kitchen. Such audio information may be captured at some or all of the physical locations 124 within the kitchen subdivision 130.

Combining received RF fingerprint data with sensor output data generated by one or more sensors carried by the portable electronic device 122 may form a data cluster. In embodiments, the portable electronic device 122 may selectively generate one or more data clusters by combining some or all of the received RF fingerprint data with some or all of the data or information included in received sensor output data. For each physical location 124 within a subdivision 130, the RF fingerprint may vary, however sufficient similarity may exist between the data or information included in the portable electronic device sensor output data to permit the conclusion that all of the data clusters having different RF fingerprints but similar sensor output data represent different physical locations 124 within a common subdivision 130.

For example, a number of RF fingerprints will exist at different physical locations 124 within a subdivision 130 such as a kitchen, however, the characteristic sounds of a running refrigerator or running garbage disposal may be heard throughout the kitchen subdivision 130. In such an instance, it may be concluded that while the RF fingerprints logically associated with some or all of the data clusters differ (i.e., represent different physical locations 124) and some or all of the data clusters share sufficiently similar sensor output data (i.e., audio signal that includes a refrigerator running or a garbage disposal operating) represent physical locations 124 within a common subdivision 130 (i.e., the kitchen). In such an instance, the portable electronic device 120 may propose a semantic label such as "kitchen" for logical association with the "virtual" subdivision defined by each of the data clusters. In other words, the portable electronic device is able to assign a semantic label to a collection of data clusters defined by one or more physical locations 124 in the structure 112.

Although depicted as structures in FIG. 1, the locations 102 may include any number and/or combination of indoor locations and outdoor locations. For example, a portable electronic device 120 may be positioned in a physical location where RF signals 106 from multiple RF transmitters 104 are received. Such may include a mixture of RF signals such as: an unsecure outdoor Wi-Fi connection in a public park, an unsecure indoor Wi-Fi connection in a library, and a secure indoor Wi-Fi connection in a private home. Each of the locations 102 contains one or more RF transmitters 104 that generate an RF signal 106 that contains at least a unique identifier 108 that is logically associated or associable with the originating RF transmitter 104.

The RF transmitter 104 may include any number and/or combination of current and/or future transmitters, receivers, or transceivers capable of producing, generating, and emitting an RF signal 106 that includes a unique identifier 108. In some implementations, the RF transmitter 104 may include one or more wireless routers, such as one or more IEEE 802.11 (latest version) compliant wireless routers. In some implementations, the RF transmitter 104 may include one or more wired or wireless modems, such as one or more wired cable modems, one or more wired digital subscriber line (DSL) modems, or one or more satellite connected modems. In some implementations, the RF transmitter 104 may include one or more portable electronic devices capable of operation in a "wireless hotspot" or "hotspot" mode.

Each RF transmitter 104 may produce, generate, and/or emit an RF signal 106 that includes a unique identifier 108 and has a signal strength 110 that varies somewhere between the inverse of the square of the distance ($1/d^2$) and the inverse of the fifth-power of the distance ($1/d^5$) from the respective RF transmitter. In embodiments, each RF transmitter 104 may form a portion of a network such as a packet switched network using frames, packets, or similar discrete logical structures that include a header or similar logical format that includes data indicative of an identifier unique to the respective RF transmitter. In such embodiments, the unique identifier 108 may include data indicative of a network interface card (NIC) identifier. In some implementations, the unique identifier may include data indicative of a media access card (MAC) address. In some implementations, the RF transmitter 104 may include a transmitter or transceiver compliant with any current or future IEEE 802.11 (Wi-Fi) standard. In some implementations, the RF transmitter 104 may include a transmitter or transceiver compliant with any current or future BLUETOOTH® standard. In some implementations, the RF transmitter 104 may include a transmitter or transceiver compliant with any current or future Near Field Communication (NFC) standard. In some implementations, the RF transmitter 104 may include any number or combination of transmitters or transceivers compliant with any current or future wireless digital data transmission standard.

The structure 112 may include any structure having one or more subdivisions 130A-130n. In some implementations, the structure 112 may include an enclosed structure such as a house, commercial building, shopping mall, or any other closed structure. In some implementations, the structure 112 may include an open or semi-open structure such as an outdoor park, amphitheater, or any other partially or completely open structure in a defined area. A single structure 112 may include or incorporate any number of physical locations 124A-124n. A single structure 112 may include or incorporate any number of subdivisions 130. A single subdivision 130 may include any number of physical locations 124.

For example, a structure 112 such as an office building may include tens or even hundreds of subdivision 130 such as offices and conference rooms. Each of the subdivisions 130 in the structure 112 may include a number of physical locations 124. In another example, a structure 112 may include a public park that includes a number of subdivisions 130 such as a children's playground, a tennis court, a swimming pool, and a nature area. Each of the subdivisions 130 in the structure 112 may include a number of physical locations 124.

Figure 2:
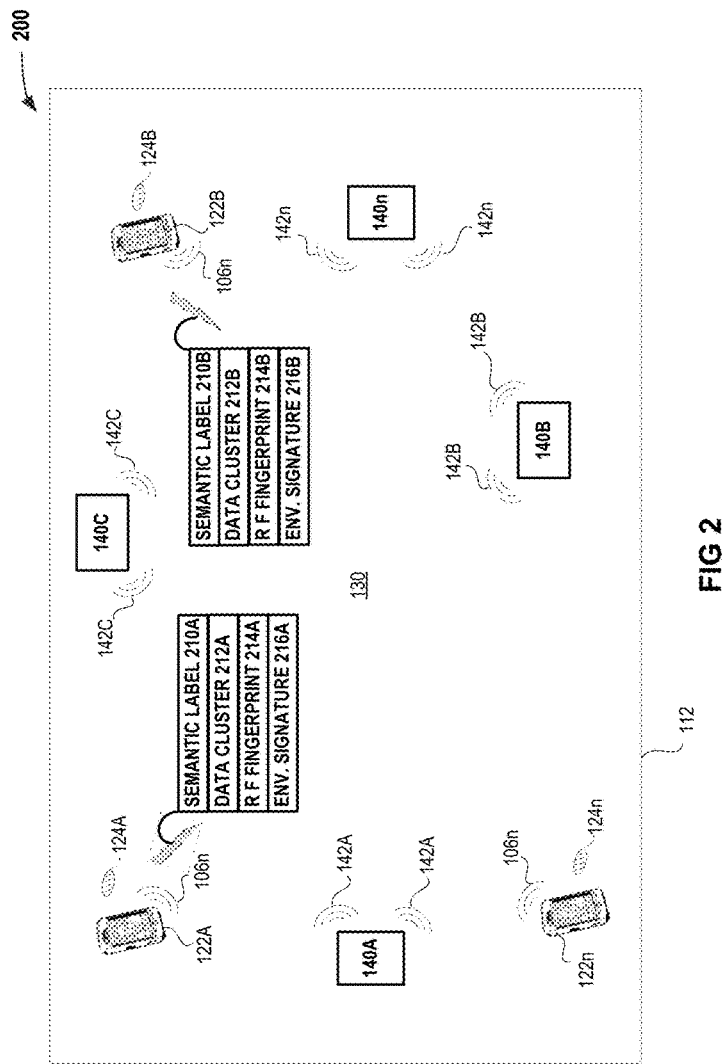
FIG. 2 provides a schematic of an illustrative autonomous semantic labeling system using multiple devices in a room, in accordance with at least one embodiment of the present disclosure.

FIG. 2 depicts an illustrative subdivision 130 that includes multiple elements 140 and multiple portable electronic devices 122A-122n disposed in different physical locations 124A-124n throughout the subdivision 130, in accordance with at least one embodiment of the present disclosure. The subdivision 130 may include any indoor or outdoor location. As depicted in FIG. 2, portable electronic devices 122A and 122B are disposed within the subdivision 130 at physical locations 124A and 124B, respectively. Portable electronic devices 122A and 122B communicate a data cluster 212A, 212B and a logically associated sematic label 210A, 210B to portable electronic device 122n. Data clusters 212A and 212B include respective RF fingerprints 214A, 214B (collectively, "RF fingerprints 214") and respective environmental fingerprints 216A, 216B. In one example, the environmental signature 216A and 216B (collectively, "environmental signatures 216") provided by the portable electronic devices 122A and 122B to the portable electronic device 122n may include a number of environmental signatures 142A-142n originating from a respective number of environmental elements 140A-140n disposed in, on, about, or around the subdivision 130.

In one embodiment, portable electronic devices 122A and 122B may be disposed in a kitchen and the environmental elements may include items typically encountered in a kitchen, such as a refrigerator 140A, a garbage disposal 140B, and a range hood 140C. The environmental signatures 142A-142C may be generated by the respective environmental element 140A-140C. In such an embodiment, portable electronic devices 122A and 122B may communicate data clusters 212A and 212B, respectively, to portable electronic device 122n. Portable electronic device 122n may receive data clusters 212A and 212B and compare the environmental signature 142A and 142B with the locally collected environmental signature 142n. If the locally collected environmental signature 142n compares favorably with (i.e., within a defined limit or tolerance) environmental signatures 142A and 142B, portable electronic device 122n may conclude that physical location 124n lies within the same subdivision 130 as physical locations 124A and 124B, and may suggest or propose the use of the semantic label 210A and 210B "KITCHEN" provided by portable electronic devices 122A and 122B.

Such communication between portable electronic device 122n and portable electronic devices 122A and 122B beneficially improves the accuracy and speed of determining an appropriate semantic label using one or more virtual room data clusters collected by portable electronic device 122n. This merging of location data or information provided by the RF fingerprint with a locally obtained environmental signature 216 provides significant improvements in accuracy and semantic labeling when compared to systems and methods reliant on RF fingerprinting alone.

Figure 3:
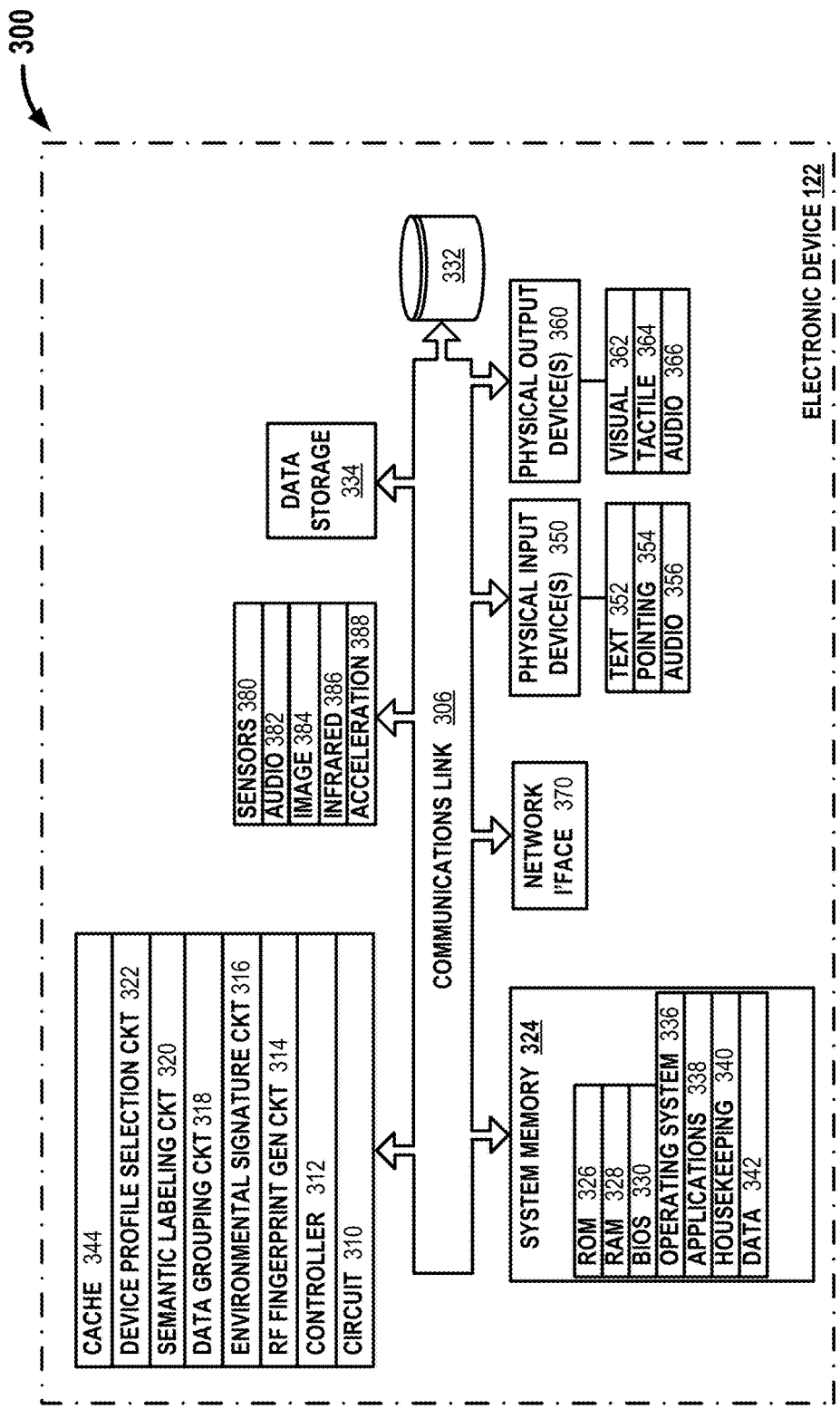
FIG. 3 provides a block diagram of an example system on which the autonomous semantic labeling system may be implemented, in accordance with at least one embodiment of the present disclosure.

FIG. 3 and the following discussion provide a brief, general description of the components forming an illustrative system 300 that includes one or more semantic labeling controller(s) 312 in which the various illustrated embodiments of the portable electronic device 122 may be implemented. Some embodiments may include machine-readable or computer-executable instruction sets, such as program application modules, objects, or macros being executed by the one or more semantic labeling controller(s) 312. Some embodiments may include circuitry implemented in the form of hard-wired circuitry, semiconductor circuitry, microprocessors, controllers, or similar devices that provide radio frequency (RF) fingerprint circuitry 314, environmental signature circuitry 316, data grouping circuitry 318, semantic labeling circuitry 320, device profile selection circuitry 322, and similar.

Those skilled in the relevant art will appreciate that the illustrated embodiments as well as other embodiments can be practiced with other circuit-based device configurations, including portable electronic or handheld electronic devices, for instance smartphones, portable computers, wearable computers, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The portable electronic device 122 may include any number of circuits 310, each of which may include a variety of electronic and/or semiconductor components that are disposed partially or wholly in a wearable computer, portable computing device, personal digital assistant, personal computer, or other similar current or future processor-based devices and/or systems capable of executing machine-readable instructions. The one or more circuits 310 may be interconnected with, electrically coupled, and/or communicably coupled to various components within the portable electronic device 122 via one or more communications links 306. As depicted in FIG. 3, the one or more circuits 310 may be apportioned or allocated to one or more controllers 312, RF fingerprint generation circuitry 314, environmental signature circuitry 316, data grouping circuitry 318, semantic labeling circuitry 320, and device profile selection circuitry 322.

As depicted in FIG. 3, system components such as a system memory 322 may be communicably coupled to the one or more circuits 310 via the one or more communications links 306. The portable electronic device 122 may, at times, be referred to in the singular herein, but this is not intended to limit the embodiments to a single system, since in certain embodiments, there will be more than one portable electronic device 122 or other networked systems, circuits, or devices involved.

The one or more circuits 310 may include any number, type, or combination of conductors, insulators, electrical devices, and/or semiconductor components. At times, the one or more circuits 310 may be implemented in whole or in part in the form of semiconductor devices such as diodes, transistors, inductors, capacitors, and resistors. Such an implementation may include, but is not limited to any current or future developed single- or multi-core processor or microprocessor, such as: one or more systems on a chip (SOCs); one or more central processing units (CPUs); one or more digital signal processors (DSPs); one or more graphics processing units (GPUs); one or more application-specific integrated circuits (ASICs), one or more field programmable gate arrays (FPGAs), and the like. Unless described otherwise, the construction and operation of the various blocks shown in FIG. 3 are of conventional design. As a result, such blocks need not be described in further detail herein, as they will be understood by those skilled in the relevant art. The one or more communications links 306 that interconnects at least some of the components may employ any known serial or parallel bus structures or architectures.

The system memory 322 may include read-only memory ("ROM") 324 and random access memory ("RAM") 326. A portion of the ROM 324 may contain a basic input/output system ("BIOS") 328. The BIOS 328 may provide basic functionality to the portable electronic device 122. For example, by causing, in some implementations, the one or more circuits 310 to load one or more machine-readable instruction sets that cause the one or more circuits 310 to provide and function as a particular and specialized semantic labeling controller 312. In another example, the BIOS 328 may cause a general purpose circuit 310, processor, microprocessor, or similar device to execute machine-readable instruction sets that cause the general purpose circuit 310 to transform into one or more specialized or particular machines and/or circuitry such as the RF fingerprint generation circuitry 314, environmental signature circuitry 316, data grouping circuitry 318, semantic labeling circuitry 320, and device profile selection circuitry 322.

The portable electronic device 122 may include one or more communicably coupled, non-transitory, data storage devices 332. The one or more data storage devices 332 may include any number and/or combination of any current or future developed non-transitory storage devices and/or memory. Non-limiting examples of such non-transitory, data storage devices 332 may include, but are not limited to one or more magnetic storage devices, one or more optical storage devices, one or more solid-state electromagnetic storage devices, one or more electroresistive storage devices, one or more molecular storage devices, one or more quantum storage devices, or various combinations thereof.

The one or more storage devices 332 may include interfaces or controllers (not shown) communicatively coupling the respective storage device(s) 332 to the one or more communications links 306, as is known by those skilled in the art. The one or more storage devices 332 may contain machine-readable instruction sets, data structures, program modules, and other data useful to the portable electronic device 122. In some instances, one or more external storage devices 330 may be communicably coupled to the portable electronic device 122. Such external storage devices 330 may be local to the portable electronic device 122 or remote from the portable electronic device 122. In one example, the one or more external storage devices 330 may include one or more remote server based storage devices or "cloud" storage devices that are bi-directionally communicably coupled to the portable electronic device 122 via one or more networks, such as one or more wireless networks (e.g., IEEE 802.11 "Wi-Fi"), one or more wired networks (e.g., IEEE 802.3 "Ethernet"), or combinations thereof.

The portable electronic device 122 may include a number of sensors 380 that are communicably coupled to the semantic labeling controller 312 and/or the environmental signature circuit 316 via the one or more communications links 306. In some implementations, the sensors 380 may include some or all of: one or more audio input sensors 382 (e.g., one or more microphones or similar); one or more image sensors 384 (e.g., one or more charge coupled device (CCD) or complementary metal oxide semiconductor (CMOS) image sensors, ambient light level sensors, or similar); one or more infrared illuminators/infrared image acquisition sensors 386; one or more movement or motion based sensors 388, or combinations thereof. In at least some implementations, such sensors 380 may autonomously collect environmental data or information on a regular, irregular, periodic, or aperiodic basis.

Machine-readable instruction sets and/or applications 338 and housekeeping instruction sets 340 may be stored or otherwise retained in whole or in part in the system memory 324. Such instruction sets may be transferred from one or more storage devices 332 and/or one or more external storage devices 332 and stored in the system memory 324 in whole or in part for execution by the one or more circuits 310. The machine-readable instruction sets 338 may include instructions and/or logic providing the semantic labeling functions and capabilities described herein.

For example, one or more applications 338 may cause the RF fingerprint generation circuitry 314 to collect data representative of one or more parameters associated with each of a plurality of RF signals received by the portable electronic device 122. The one or more applications 338 may further cause the RF fingerprint generation circuitry 314 to generate a signal that includes the collected data representative of one or more parameters associated with each of a plurality of RF signals received by the portable electronic device 122.

In some implementations, the RF fingerprint generation circuitry 314 may collect data from a plurality of RF signals received within at least one defined frequency band. Such frequency bands may include, but are not limited to, an IEEE 802.11 (WiFi) frequency band, a BLUETOOTH® frequency band, a Near Field Communication frequency band, or combinations thereof. In some implementations, the RF fingerprint generation circuitry 314 may generate a signal containing data associated with each of the received RF signals—this data may include, but is not limited to, one or more of the following: a signal strength, a signal frequency, a unique signal identifier, a unique signal transmitter identifier, a signal phase, or a signal direction. The one or more applications 338 may further cause the RF fingerprint generation circuitry 314 to combine the collected RF signal information or data into an RF fingerprint 214 that may be logically associated with a particular physical or geographic location 124.

The one or more applications 338 may additionally cause the RF fingerprint generation circuitry 314 to collect RF samples at defined intervals which may be fixed, periodic, or based on the occurrence or lack of occurrence of one or more defined events. For example, the one or more applications 338 may cause the RF fingerprint generation circuitry 314 to collect RF samples at a slower rate when the portable electronic device 122 remains stationary or when the portable electronic device 122 remains stationary for a time greater than a defined temporal interval.

The one or more applications 338 may further cause the RF fingerprint generation circuitry 314 to discard collected RF samples or to not collect RF samples based on an occurrence or a lack of an occurrence of one or more defined events. For example, the one or more machine-readable instruction sets 338 may cause RF fingerprint generation circuitry to halt collection of RF samples when the portable electronic device 122 is moving or when the portable electronic device 122 is moving at a rate or velocity greater than a defined value.

The one or more applications 338 may cause the environmental signature circuitry 316 to collect environmental data or information from the one or more sensors 380. The one or more applications 338 may cause the environmental signature circuitry 316 to further generate an environmental signature signal that includes data indicative of one or more parameters of the environment about the portable electronic device 122.

Such environmental data may include audio information collected using one or more audio sensors 382 (e.g., one or more microphones); one or more image sensors 384 (e.g., one or more image acquisition devices sensitive in one or more spectral bands such as the visible spectral band of 380 nanometers to 760 nanometers, or the near infrared spectral band greater than 760 nm). Such environmental data may include movement, motion, orientation, and/or acceleration information or data collected from one or more MEMS devices, such as one or more accelerometers or gyroscopic devices coupled to a portable electronic device. Such environmental data may include geolocation data, such as global positioning system data. In embodiments, such environmental data or information may be collected contemporaneously with the collection of RF signal data by the RF fingerprint generation circuitry. In other embodiments, such environmental data or information may be collected at different times than the collection of RF signal data.

The one or more applications 338 may cause the data grouping circuitry 316 to generate one or more data clusters 212 by selectively combining one or more RF fingerprints 214 received from the RF fingerprint generation circuitry 314 with one or more environmental signatures 216 received from the environmental signature circuits 316. In some implementations, the one or more applications 338 may cause the portable electronic device 122 to logically associate, on at least an interim basis, such data clusters 212 with a "virtual" room or similar logical entity prior to establishing a logical association with a defined semantic label.

The one or more applications 338 may cause the semantic labeling circuitry 320 to autonomously analyze some or all of the data clusters and autonomously generate a proposed semantic label 210 for logical association with at least one of: the data cluster 212, the RF fingerprint 214, and/or the environmental signature 216. In some implementations the one or more applications 338 may prompt a device user to accept the proposed semantic label 210. In some implementations, the one or more applications 338 may cause the semantic labeling circuit 320 to autonomously analyze the data clusters by comparing some or all of the environmental signatures 216 included in the data cluster to a plurality of known or identified environmental signatures 216 that have been previously logically associated with a respective semantic label 210.

The one or more applications 338 may cause the semantic labeling circuitry 320 to autonomously populate an environmental signature database, data structure, or data store with information and/or data indicative of environmental signatures and their logically associated semantic label. In some instances, the one or more applications 338 may cause the semantic labeling circuitry 320 to exchange such environmental signature/semantic label information with one or more other local portable electronic devices 122. In some instances, the one or more applications 338 may cause the semantic labeling circuitry 320 to communicate such environmental signature/semantic label information to one or more remote servers or cloud-based storage devices accessible to multiple portable electronic devices 122. In such a manner, the systems and methods described herein may beneficially "learn" new environmental signatures 216 and provide more accurate sematic label suggestions based on the environmental data or information received by the semantic labeling circuitry 320.

The one or more applications 338 may cause the RF fingerprint generator circuitry 314 and/or the environmental signature circuitry 316 to selectively filter or otherwise apply noise reduction techniques to the received RF signals or information and/or the received environmental data or information. In some implementations, the one or more applications 338 may cause the environmental signature circuitry 316 to extract one or more environmental signature(s) 216 from a noisy signal provided by one or more sensor(s) 380. In some implementations, the one or more applications 338 may cause the environmental signature circuitry 316 to perform an i-vector linear discriminant analysis (i-vector/LDA) to take all acoustic features (Mel-frequency Cepstral Coefficients/Perceptual Linear Prediction or MFCC/PLP) in a segment of environmental data, such as an audio signal collected using an audio input device 382. In some other implementations, the MFCC/PLP or mel-filterbank outputs may cause the environmental signature circuitry 316 to extract bottleneck features of a deep neural network or convolutional neural network trained to discriminate different sounds sources, and the bottleneck features may be computed for every data frame which are averaged to produce one vector for the segment. In embodiments, to account for the random nature of sounds within the environment in a subdivision 130, the environmental data may be clustered into a small number of centroids. Depending on local environmental conditions, a single semantic label (e.g., "Kitchen," "Bedroom") may contain more than one centroid to accommodate the inherent variability of the environment within the subdivision. In embodiments, the one or more applications 338 may cause the environmental signature circuitry 316 to infer a semantic label by determining a distance to the nearest centroid.

The one or more applications 338 may cause the device profile selection circuitry 322 to retrieve one or more device parameters from a data store, data set, data base, or similar data storage structure. In some implementations, the one or more applications 338 may cause the device profile selection circuitry 322 to select the one or more device profiles based at least in part on an RF fingerprint 214, an environmental signature 216, a semantic label 210, or combinations thereof.

The portable electronic device 122 may include one or more communicably coupled physical input devices 350, such as one or more text entry devices 352 (e.g., keyboard), one or more pointing devices 354 (e.g., mouse, trackball, touchscreen), and/or one or more audio input devices 356. Such physical input devices 350 may be used, for example, to provide, enter, or otherwise supply commands (e.g., acknowledgements, selections, confirmations, and similar) as well as information (e.g., acknowledgements, corrected semantic labels, and similar) to the semantic labeling controller 312. The portable electronic device 122 may include one or more communicably coupled physical output devices 360, such as one or more visual output devices 362 (e.g., a display device), one or more tactile output devices 364 (e.g., haptic feedback or similar), one or more audio output devices 366, or any combination thereof.

For convenience, the network interface 370, the one or more circuits 310, the system memory 324, the physical input devices 350 and the physical output devices 360 are illustrated as communicatively coupled to each other via the one or more communications links 306, thereby providing connectivity between the above-described components. In alternative embodiments, the above-described components may be communicatively coupled in a different manner than illustrated in FIG. 3. For example, one or more of the above-described components may be directly coupled to other components, or may be coupled to each other, via one or more intermediary components (not shown). In some embodiments, the one or more communications links 306 may be omitted and the components are coupled directly to each other using suitable wired or wireless connections.

Figure 4:
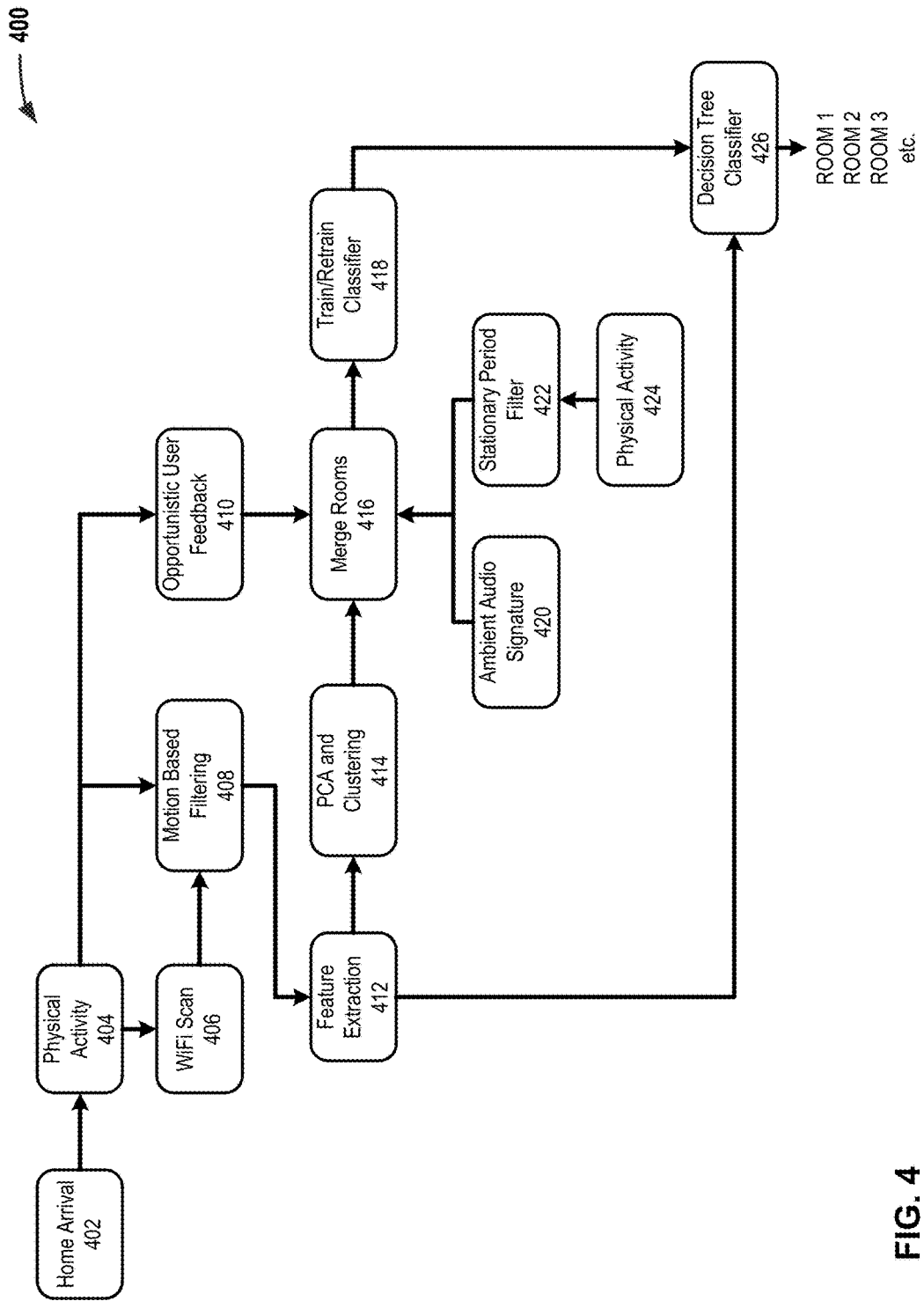
FIG. 4 provides a high-level block flow diagram of an example semantic labeling method, in accordance with at least one embodiment of the present disclosure.

FIG. 4 provides a high-level, block flow diagram of an illustrative semantic labeling method 400 that may be implemented on a portable electronic device 122, in accordance with at least one embodiment of the present disclosure. The method 400 commences with arrival at an identified location at 402. In embodiments, the arrival may be detected by receiving data from a previously identified source, for example a home Wi-Fi server. In embodiments, arrival at a location, coupled with one or more defined physical activities 404 causes the RF fingerprint generation circuitry 314 to scan 406 for the presence of other RF signals. In such embodiments, such RF signal scanning may be instigated based on the portable electronic device remaining in a stationary location or within a defined distance of a physical location 124 for a time that exceeds a defined threshold.

In some implementations, the RF fingerprint generation circuitry 314 may halt the collection of RF signal data or information at 408, for example when the RF fingerprint generation circuitry 314 determines the portable electronic device 112 is in motion between physical locations 124. In some implementations, the RF fingerprint generation circuitry 314 may filter or otherwise condition the collected RF signals based at least in part on the movement or motion of the portable electronic device 122 within a subdivision 130 at 408.

In some implementations, the RF fingerprint generation circuitry 314 may aggregate the filtered RF signals and extract features characterizing the received RF signals to provide an RF fingerprint 214 at 412. After collecting a sufficient number of RF signals and extracting the features characterizing the received RF signals, the RF fingerprint generation circuitry 314 may commence a background task that includes unsupervised clustering of the features into one or more data clusters 212. To reduce noise and signal fluctuation in the received RF data the RF fingerprint generation circuitry 314 may apply a principal component analysis (PCA) or other dimensionality reduction and de-noising techniques to the features characterizing the received RF signals prior to clustering at 414.

In embodiments, the semantic labeling circuitry 322 may opportunistically prompt for user annotation and feedback at 410. In some implementations, the semantic labeling circuitry 322 may opportunistically prompt for user annotation and feedback based at least in part on the motion or movement of the portable electronic device 122. In at least some implementations, the user supplied input may be used to merge subdivisions and to map virtual subdivisions to physical subdivisions at 416 by logically associating meaningful semantic labels to the collected RF data. In embodiments, the semantic labeling circuitry 320 may request such opportunistic feedback when the user is detected in an idle state (i.e., a non-moving state). Such opportunistic feedback may include providing a correct label for the subdivision 130 currently occupied by the user; acknowledging that the autonomously selected semantic label 210 proposed by the semantic labeling circuitry 320 is correct; or, correcting an incorrect, autonomously selected, semantic label 210 proposed by the semantic labeling circuitry 320.

In some implementations, the environmental signature circuitry 316 may collect ambient environmental signatures at 420. The semantic labeling circuitry 320 may logically associate one or more environmental signatures 216, for example one or more environmental audio signatures, with a physical subdivision 130, such as a physical room, at 416. In some implementations, the semantic labeling circuitry 320 may identify one or more virtual subdivisions by matching or otherwise correlating one or more environmental signatures 216 collected from the virtual subdivision with one or more environmental signatures 216 logically associated with a physical subdivision 130.

In some implementations, the semantic labeling circuitry 320 may logically associate an environmental signature 216 with a physical subdivision 130. In order to provide timely and appropriate requests for user annotation of virtual subdivisions or confirmation of an autonomously generated semantic label 210 proposed by the semantic labeling controller 312 (e.g., the user and the portable electric device 122 are stationary), the semantic labeling circuitry 320 may monitor the physical activity of the user at 424 or the movement of the portable electronic device 122. Using a stationary period filter at 422 that determines when the physical activity of the user or the movement of the of the portable electronic device 122 meets one or more defined criteria the semantic labeling circuitry 320 may autonomously propose a semantic label for one or more virtual subdivisions based at least in part on the environmental signatures 216 logically associated with physical subdivisions 130.

In at least some implementations, the semantic labeling circuitry 320 may be trained at 418 based on semantic labeling information provided by the user of the portable electronic device 122 and/or user confirmation of a semantic label autonomously proposed by the semantic labeling circuitry 320. The trained semantic labeling circuitry 320 may, in some implementations, use a classifier or similar logical structure, such as a decision tree classifier at 432, to propose future semantic labeling based on data or information such as the RF fingerprint 214 and/or the environmental signature 216 logically associated with a virtual subdivision. In embodiments, such training may also provide feedback on the performance of the semantic labeling circuitry 320. Such feedback may beneficially be used to identify "high-performing" semantic labeling circuitry 320 able to reliably and accurately identify appropriate semantic labels 210 for virtual subdivisions. Such high performing semantic labeling circuitry 320 may then reliably and accurately autonomously logically associate semantic labels 210 with virtual subdivisions in the absence of user input. For example, if a certain population of RF fingerprints in a virtual subdivision may be classified with high confidence as a known physical subdivision, then the virtual subdivision may share the room label and be correctly mapped into the corresponding physical subdivision.

Figure 5:
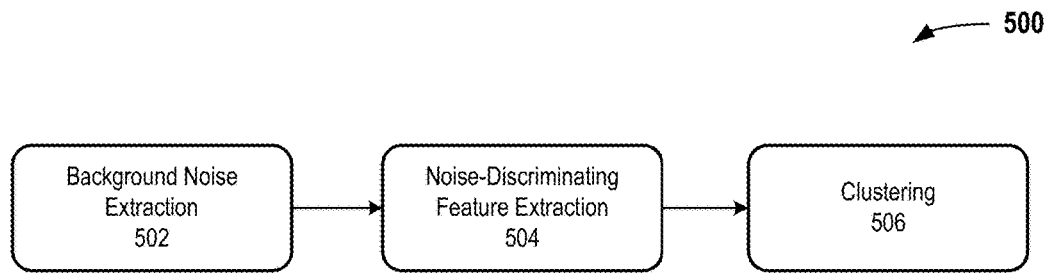
FIG. 5 provides a high-level block flow diagram of an example environmental signature content extraction system for use with the semantic labeling method in FIG. 4, in accordance with at least one embodiment of the present disclosure.

FIG. 5 provides a high-level block flow diagram of an example environmental signature content extraction method 500 that may be used with the semantic labeling method 400 in FIG. 4, in accordance with at least one embodiment of the present disclosure. Although FIG. 5 is discussed in terms of an acoustic environmental signature, those of ordinary skill in the art will appreciate the applicability of the systems and methods disclosed herein to other forms and types of environmental signatures. 216 that do not rely upon an acoustic environmental signature.

In embodiments, the environmental signature 216 or acoustic signature of a subdivision 130 such as a room may primarily be characterized by the low energy or low frequency components rather than the high energy or high frequency components. Thus, low frequency sounds such as HVAC system operation, outside road traffic, and refrigerator hum are environmental signatures 216 that may be characterized by the environmental signature circuitry 316.

At 502, the environmental signature circuitry 316 collects data representative of the ambient audio environment about the portable electronic device 122. The collected audio data may include both high frequency components (e.g., voices, television audio, and similar) as well as low frequency components (e.g., HVAC hum, refrigerator running, exterior traffic, and similar). In some implementations, the environmental signature circuitry 316 may selectively extract all or a portion of the low frequency components present in the ambient audio data. The environmental signature circuitry 316 may collect such low frequency components of the environmental signature 216 for a defined time period, such as 15 seconds, 30 seconds, 45 seconds, or 60 seconds.

At 504, the environmental signature circuitry 316 may extract features from the collected environmental signature 216. In embodiments, during the feature extraction at 504, the environmental signature circuitry 316 may target desired properties such as providing a compact representation of the environmental signature 216 and discriminating between frequencies included in the environmental signature 216 by positioning the frequencies far apart in a feature space. In some implementations, the desired properties of the environmental signature 216 may be targeted using an i-vector/DLA and/or the bottleneck features of a deep neural network (DNN). The i-vector collects all environmental signatures in the collected environmental data or information and produces a single vector; the bottleneck feature may then be computed for every set of environmental signature data or information to produce a segment of the single vector.

At 506, the data grouping circuitry 318 clusters the environmental signatures 216 associated with a single virtual subdivision into a number of centroids. One advantage of the systems and methods described herein is the opportunity to prompt for user feedback to assist the semantic labeling controller 312 in merging and purging subdivisions.

The semantic labeling controller 312 disclosed herein beneficially fuses RF fingerprint data 214 with environmental signature data 216 to capture the context of a subdivision 130 and leverages the fusion of the RF and environmental data to autonomously propagate semantic labels or merge subdivisions 130. For example, the environmental signature 216 of a subdivision 130 is likely unique across different subdivisions 130 and may be used by the semantic labeling controller 312 as a signature to identify different subdivisions 130. Virtual subdivisions discovered by the semantic labeling controller 312 that share a similar environmental signature 216 with a previously identified physical subdivision 130 may then merged (e.g., based on proximity data gathered from the RF fingerprint 214) or labeled autonomously by the semantic labeling controller 312 without requiring user input. Similarly, by fusing environmental signature data such as accelerometer data, different virtual subdivisions detected while the portable electronic device 122 is maintained stationary may be autonomously merged or labeled accordingly if the time the portable electronic device 122 remains stationary overlaps with the detection of a physical subdivision 130.

Figure 6:
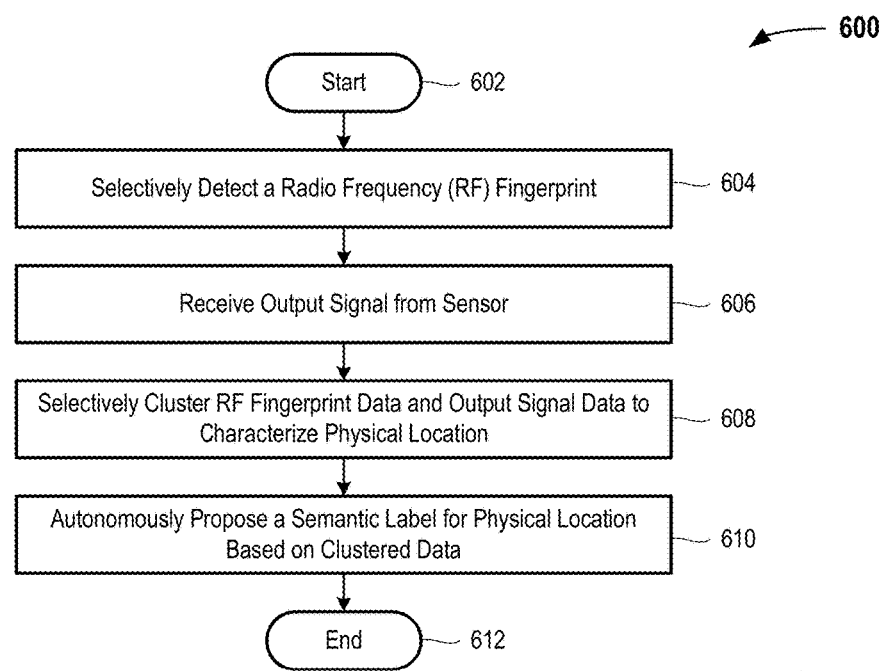
FIG. 6 provides a high-level logic flow diagram of an example semantic labeling method, in accordance with at least one embodiment of the present disclosure.

FIG. 6 presents a high-level logic flow diagram of an illustrative semantic labeling method 600 that may be implemented using one or more semantic labeling controllers 312 such as those described in detail with regard to FIGS. 1 through 5, in accordance with at least one embodiment of the present disclosure. The method 600 commences at 602.

At 604, the RF fingerprint generation circuitry 314 selectively detects a number of radio frequency (RF) signals 106. Given the receipt of a plurality of RF signals 106 by the RF fingerprint generation circuitry 314, a physical location 124 may be identified based on a respective unique identifier 108 carried by and logically associated with each of the RF signals 106 and a respective signal strength of each of the RF signals 106. The RF fingerprint generation circuitry 314 may filter, process, or otherwise condition some or all of the received RF signals 106 to provide an RF fingerprint 214 that is unique to a particular physical location 124 within a three dimensional space.

In some implementations, the RF fingerprint generation circuitry 314 may selectively sample the received RF signals on an intermittent, continuous, periodic, or aperiodic basis. In some implementations, such sampling may be based on one or more environmental parameters, for example whether the portable electronic device 122 is in motion and/or the velocity of the portable electronic device 122. In some implementations, the RF fingerprint generation circuitry 314 autonomously determines an RF signal sampling rate.

At 606, the environmental signature circuitry 316 receives one or more output signals provided by one or more environmental sensors carried by the portable electronic device 122. In embodiments, the output signals provide an environmental signature 216 that characterizes the physical location 124 of the portable electronic device 122. In some implementations, the environmental signature circuitry 316 collects environmental signature data 216 at least partially contemporaneous with the receipt of RF fingerprint data 214. In some implementations, the environmental signature circuitry 316 collects environmental signature data 216 asynchronously with the receipt of RF fingerprint data 214.

In embodiments, the environmental sensors 380 may include any number and/or combination of sensors capable of providing the semantic labeling circuitry 320 with an output signal that includes data or information related to either the portable electronic device 122 or the environment surrounding the portable electronic device 122. Such data or information may include, but is not limited to, data or information related to: environmental audio, environmental imaging, environmental light levels, environmental humidity, environmental temperature, environmental pressure, movement/motion/velocity of the portable electronic device 122, acceleration of the portable electronic device 122, physical/gyroscopic orientation of the portable electronic device 122, or combinations thereof.

At 608, the data grouping circuitry 318 selectively clusters at least a portion of the received RF fingerprint data 214 with at least a portion of the environmental signature data 216 to provide a data cluster 212. In embodiments, the data grouping circuitry 318 may logically associate one or more data clusters 212 with the physical location 124 of the portable electronic device 122 at the time the RF fingerprint 214 and the environmental signature 216 were collected by the semantic labeling controller 312. Each data cluster 212 uniquely identifies a particular physical location 124 based on the RF fingerprint 214 and the environmental signature 216 received by the semantic labeling circuitry 320.

At 610, the semantic labeling circuitry 320 may autonomously propose a semantic label 210 for logical association with a physical subdivision 130 based at least in part on the data cluster 212 generated by the semantic labeling controller 312 at a physical location 124 within the respective physical subdivision 130. In some implementations, the semantic labeling circuitry 320 may autonomously select a proposed semantic label 210 for logical association with a physical subdivision 130 based at least in part on a favorable comparison between an environmental signature 216 collected by the environmental signature circuitry 316 and an entry in a database or data store that logically relates that include environmental signatures 216 with physical subdivisions 130. In some implementations, the semantic labeling circuitry 320 may autonomously select a proposed semantic label 210 for logical association with a physical subdivision 130 based at least in part on a favorable comparison between an RF fingerprint 214 collected by the RF fingerprint generator circuitry 314 and an entry in a database or data store that logically relates that include RF fingerprints 214 with physical subdivisions 130. In some implementations, the semantic labeling circuitry 320 may autonomously select a proposed semantic label 210 for logical association with a physical subdivision 130 based at least in part on a favorable comparison between an RF fingerprint 214 and an environmental signature 216 and an entry in a database or data store that logically relates that includes RF fingerprints 214 and environmental signatures 216 with physical subdivisions 130.

In some implementations, the database, data store, or similar data structure that logically relates RF fingerprints 214 and environmental signatures 216 with physical subdivisions 130 may be stored or otherwise retained in a storage device 332, 334 communicably coupled to the semantic labeling controller 312. In some implementations, the storage device 332 may be disposed local to the semantic labeling circuitry 320. In other implementations, the storage device 332 may be disposed remote from the semantic labeling circuitry 320 and may be communicably coupled via one or more wireless or wired networks. The method 600 concludes at 612.

Figure 7:
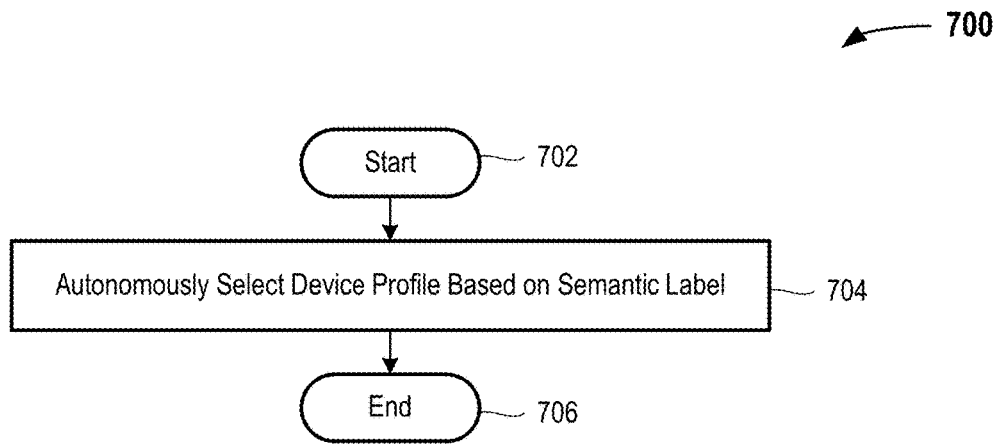
FIG. 7 provides a high-level logic flow diagram of an example semantic labeling method that includes autonomous device profile selection, in accordance with at least one embodiment of the present disclosure.

FIG. 7 presents a high-level logic flow diagram of an illustrative semantic labeling method 700 in which the device profile selection circuitry 322 autonomously selects a device profile based at least in part on the semantic label 210 logically associated with the subdivision 130, in accordance with at least one embodiment of the present disclosure. The method 700 commences at 702.

At 704, the device profile selection circuitry 322 directly or indirectly selects a portable electronic device profile based at least in part on the physical subdivision 130 logically associated with the physical location 124 of the portable electronic device 122. For example, the device profile selection circuitry 322 may select a device profile that reduces display brightness and reduces audio output responsive to the portable electronic device 122 being positioned in a physical location 124 that is logically associated with a semantic label 210 "BEDROOM." The method 700 concludes 706.

Figure 8:
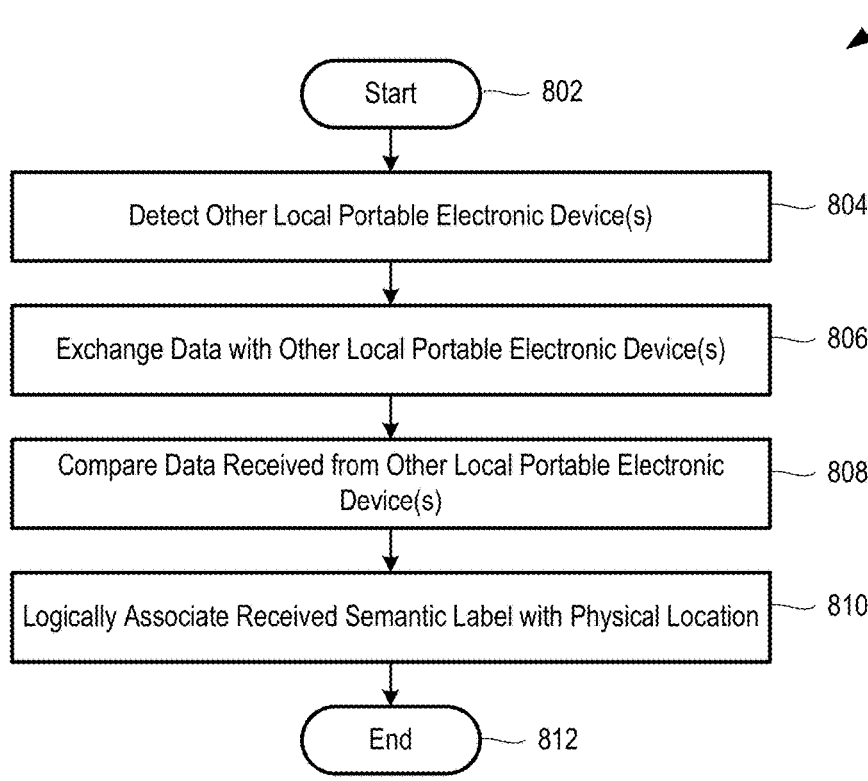
FIG. 8 provides a high-level logic flow diagram of an example semantic labeling method that includes exchanging physical location data with other local portable electronic devices, in accordance with at least one embodiment of the present disclosure.

FIG. 8 presents a high-level logic flow diagram of an illustrative semantic labeling method 800 in which a portable electronic device 122A receives data clusters 212B-212n from one or more other portable electronic devices 122B-122n disposed in the same physical subdivision 130, in accordance with at least one embodiment of the present disclosure. The method 800 commences at 802.

At 804, the portable electronic device 122A detects the presence of at least one other portable electronic device 122B-122n located in the same physical subdivision 130.

At 806, the portable electronic device 122A wirelessly exchanges data with at least some of the other portable electronic devices 122B-122n located in the same physical subdivision 130. In some implementations, such an exchange of information may occur in the background and may be transparent to the user of the portable electronic device 122A. In some implementations, such an exchange of information may occur only after receiving authorization to transmit or receive information is provided by the user of the portable electronic device 122A.

In embodiments, the portable electronic device 122A may have collected one or more RF fingerprints 214A and one or more environmental signatures 216A, but the semantic labeling controller 312A may be unable to provide a proposed semantic label 210A for logical association with the physical subdivision 130. The other portable electronic devices 122B-122n may each communicate a respective data cluster 212B-212n to the portable electronic device 122A. Each of the data clusters 212B-212n may include a respective semantic label 210B-210n and a respective environmental signature 216B-216n.

At 808, the semantic labeling controller 312A in the portable electronic device 122A may compare information, such as the environmental signature 216B-216n included in each of the received data clusters 212B-212n, with the environmental signature 216A received using the environmental sensors 380A on the portable electronic device 122A.

At 810, responsive to a favorable comparison between the environmental signature 216A received using the environmental sensors 380A on the portable electronic device 122A and an environmental signature 216B-216n included in a received data cluster 212B-212n, the semantic labeling controller 312A may logically associate the semantic label 210B in the respective data cluster 212B with the physical subdivision 130. The method concludes at 812.

Figure 9:
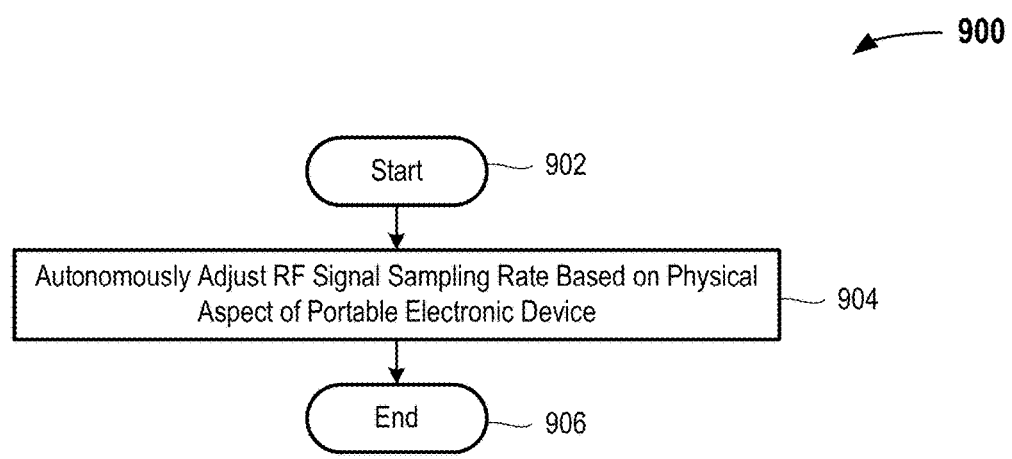
FIG. 9 provides a high-level logic flow diagram of an example semantic labeling method in which the radio frequency (RF) sampling frequency is adjusted based on a physical displacement of the portable electronic device, in accordance with at least one embodiment of the present disclosure.

FIG. 9 presents a high-level logic flow diagram of an illustrative semantic labeling method 900 in which the semantic labeling controller 312 autonomously adjusts the RF signal and/or environmental signal sampling rate based on one or more physical aspects of the portable electronic device 122, in accordance with at least one embodiment of the present disclosure. The method 900 commences at 902.

At 904, the semantic labeling controller 312 autonomously adjusts the RF signal sampling rate based at least in part on a physical aspect of the portable electronic device 122. In embodiments, the semantic labeling controller 312 may limit or even halt the collection of RF signal data and/or environmental signal data when the portable electronic device 122 is in motion. Such motion may be detected, for example, using one or more gyroscopic sensors or one or more accelerometers disposed in, on, or about the portable electronic device 122. In embodiments, the semantic labeling controller 312 may limit or even halt the collection of RF signal data and/or environmental signal data when the portable electronic device 122 is placed in a defined pose or position, such as face-down on a surface. In embodiments, the semantic labeling controller 312 may limit or even halt the collection of RF signal data and/or environmental signal data when the portable electronic device 122 is performing one or more defined functions, such as when providing global positioning system (GPS) route guidance, or when the portable electronic device 122 is coupled to a charging source. Such autonomous, active, management of data collection by the semantic labeling controller 312 may beneficially limit the volume of data collected and stored in the portable electronic device 122, thereby conserving memory in the portable electronic device 122 as well as reducing noise within the signal and variations in collected data. The method 900 concludes at 906.

"Circuitry", as used in any embodiment herein, may include, for example, singly or in any combination, hard-wired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for collecting radio frequency (RF) fingerprints 214 and environmental signatures 216 in a physical location 124, analyzing the collected data and generating one or more proposed semantic labels for logical association with the physical location and with the RF fingerprint 214 and/or environmental signature 216.

According to example 1, there is provided a semantic labeling controller. The controller may include a transceiver to receive a plurality of radio frequency (RF) signals within a defined portion of the RF spectrum; a sensor to generate a signal that includes data or information indicative of an ambient environment in a physical subdivision external to the controller; RF fingerprint generator circuitry coupled to the transceiver, the RF fingerprint generator circuitry to receive a plurality of RF signals and selectively generate an RF fingerprint that includes data indicative of at least one parameter associated with each of the received RF signals; environmental signature generator circuitry coupled to the sensor, the environmental signature generator circuitry to receive the signal that includes data or information indicative of the ambient environment in the physical subdivision and selectively generate an environmental signature that includes data indicative of the ambient environment external to the controller; data grouping circuitry coupled to the RF fingerprint generator circuitry and to the environmental signal generator circuitry to selectively group the RF fingerprint and the environmental signature into a data cluster responsive to the RF fingerprint meeting at least one threshold condition; and semantic labeling circuitry coupled to the data grouping circuitry to autonomously generate a proposed semantic label for logical association with the physical subdivision based at least in part on the RF fingerprint and the environmental signature included in the data cluster.

Example 2 may include elements of example 1 where the transceiver, in operation, may receive RF signals within at least a portion of an RF spectrum defined by Bluetooth® or Near Field Communication (NFC) standards.

Example 3 may include elements of example 1 where the transceiver, in operation, receives RF signals within at least a portion of an RF spectrum defined by IEEE 802.11 (WiFi) standards.

Example 4 may include elements of example 3 where the RF fingerprint generator circuitry selectively generates the RF fingerprint using at least a unique identifier and a signal strength logically associated with each respective one of the plurality of received RF signals.

Example 5 may include elements of example 4 where the semantic labeling circuitry further: generates a human perceptible output that includes data indicative of the proposed semantic label; receives input indicative of a confirmation of the proposed semantic label; and responsive to receipt of the input indicative of the confirmation of the proposed semantic label, logically associates the confirmed semantic label with the physical subdivision.

Example 6 may include elements of example 5 where the sensor comprises at least one of: an audio input sensor, an ambient light sensor, an accelerometer, or an image sensor.

Example 7 may include elements of example 6, and may additionally include device profile selection circuitry coupled to the semantic labeling circuitry to select a device profile based at least in part on the identified physical subdivision.

Example 8 may include elements of example 6, and may additionally include device detection circuitry coupled to the semantic labeling circuitry and to the data grouping circuitry, the device detection circuitry to: detect a presence of at least one other local portable electronic device; receive a signal from the at least one other local portable electronic device, the signal including data representative of a semantic label and an identified data cluster logically associated with the semantic label; compare the received data representative of the identified data cluster with the data cluster generated by the data grouping circuitry; and responsive to a favorable comparison, logically associate the received semantic label with the physical subdivision.

Example 9 may include elements of example 1 where the data grouping circuitry selectively determines an RF signal sampling rate based at least in part on at least one of data or information included in the output signal from the sensor.

Example 10 may include elements of example 9 where the data grouping circuitry selectively reduces the RF signal sampling rate responsive to data or information included in the output signal of the sensor indicative of the sensor being stationary.

Example 11 may include elements of example 9 where the data grouping circuitry further selectively halts RF signal sampling responsive to data or information included in the output signal of the sensor indicative of the sensor being in motion.

Example 12 may include elements of example 1 where the data grouping circuitry selectively groups the RF fingerprint and the environmental signature into a data cluster responsive to the RF fingerprint remaining within an RF fingerprint threshold for greater than a defined temporal threshold period.

According to example 13, there is provided a semantic labeling method. The method may include selectively generating, by radio frequency (RF) fingerprint generator circuitry, an RF fingerprint that includes data indicative of at least one parameter associated with each of the received RF signals; generating, by a sensor, a signal that includes data or information indicative of an ambient environment in a physical subdivision external to the controller; generating, by environmental signature generating circuitry coupled to the sensor, an environmental signature that includes data indicative of the ambient environment external to the sensor; selectively grouping, by data grouping circuitry coupled to the RF fingerprint generator circuitry and to the environmental signal generator circuitry, the RF fingerprint and the environmental signature into a data cluster responsive to the RF fingerprint meeting at least one threshold condition; and autonomously generating, by semantic labeling circuitry coupled to the data grouping circuitry, a proposed semantic label for logical association with the physical subdivision based at least in part on the RF fingerprint and the environmental signature included in the data cluster.

Example 14 may include elements of example 13 where selectively generating an RF fingerprint that includes data indicative of at least one parameter associated with each of the received RF signals may include selectively generating, by the RF fingerprint generator circuitry, an RF fingerprint using at least one parameter from each of the plurality of received RF signals, each of the plurality of received RF signals within at least a portion of an RF spectrum that includes at least one of: a Bluetooth® RF spectrum or Near Field Communication (NFC) RF spectrum.

Example 15 may include elements of example 13 where selectively generating an RF fingerprint that includes data indicative of at least one parameter associated with each of the received RF signals may include selectively generating, by the RF fingerprint generator circuitry, an RF fingerprint using at least one parameter from each of the plurality of received RF signals, each of the plurality of received RF signals within at least a portion of an RF spectrum that includes an IEEE 802.11 (WiFi) RF spectrum.

Example 16 may include elements of example 15 where selectively generating at least one RF fingerprint using at least one parameter from each of the plurality of received RF signals may include selectively generating, by the RF fingerprint generator circuitry, at least one RF fingerprint using at least a unique identifier and a signal strength logically associated with each respective one of the plurality of received RF signals.

Example 17 may include elements of example 13 where autonomously generating a proposed semantic label for logical association with the physical subdivision based at least in part on the RF fingerprint and the environmental signature included in the data cluster may include generating, by the semantic labeling circuitry, a human perceptible output that includes data indicative of the proposed semantic label; receiving, by the semantic labeling circuitry, an input indicative of a confirmation of the proposed semantic label; and logically associating, by the semantic labeling circuitry, the confirmed semantic label with the physical subdivision responsive to receiving the input indicative of the confirmation of the semantic label.

Example 18 may include elements of example 13 where generating an environmental signature that includes data indicative of the ambient environment external to the sensor may include receiving, by a sensor, an environmental signature that includes data or information indicative of at least one of: an audible event external to the portable electronic device, an ambient light event external to the portable electronic device, an ambient motion event external to the portable electronic device, or an image of the environment external to the portable electronic device.

Example 19 may include elements of example 13, and may further include selecting, by device profile selection circuitry coupled to the semantic labeling circuitry, a portable electronic device profile based at least in part on the identified physical subdivision.

Example 20 may include elements of example 13, and may additionally include detecting, by device detection circuitry coupled to the semantic labeling circuitry and to the data grouping circuitry, a presence of at least one other local portable electronic device; receiving, by the device detection circuitry, a signal from the at least one other local portable electronic device, the signal including data representative of a semantic label and an identified data cluster logically associated with the semantic label; comparing, by the device detection circuitry, the received data representative of the identified data cluster with the data cluster generated by the data grouping circuitry; and responsive to a favorable comparison, logically associating, by the device detection circuitry, the received semantic label with the physical subdivision.

Example 21 may include elements of example 13 where selectively generating at least one RF fingerprint using at least one parameter from each of the plurality of received RF signals may include selectively determining, by the data grouping circuitry, an RF signal sampling rate based at least in part on at least one of data or information included in an output signal from the sensor.

Example 22 may include elements of example 21 where selectively determining an RF signal sampling rate based at least in part on at least one of data or information included in an output signal from the sensor may include selectively reducing the RF signal sampling rate, by the data grouping circuitry, responsive to data or information included in the output signal of the sensor indicative of the sensor being stationary.

Example 23 may include elements of example 21 where selectively determining an RF signal sampling rate based at least in part on at least one of data or information included in an output signal from the sensor may include selectively halting RF signal sampling, by the data grouping circuitry, responsive to data or information included in the output signal of the sensor indicative of the sensor being in motion.

According to example 24, there is provided an autonomous semantic labeling system, may include a means for selectively generating an RF fingerprint that includes data indicative of at least one parameter associated with each of the received RF signals; a means for generating a signal that includes data or information indicative of an ambient environment in a physical subdivision external to the system; a means for generating an environmental signature that includes data indicative of the ambient environment external to the sensor; a means for selectively grouping the RF fingerprint and the environmental signature into a data cluster responsive to the RF fingerprint meeting at least one threshold condition; and a means for autonomously generating a proposed semantic label for logical association with the physical subdivision based at least in part on the RF fingerprint and the environmental signature included in the data cluster.

Example 25 may include elements of example 24 where the means for selectively generating an RF fingerprint that includes data indicative of at least one parameter associated with each of the received RF signals may include a means for selectively generating the RF fingerprint using at least one parameter from each of the plurality of received RF signals, each of the plurality of received RF signals within at least a portion of an RF spectrum that includes at least one of: a Bluetooth® RF spectrum or Near Field Communication (NFC) RF spectrum.

Example 26 may include elements of example 24 where the means for selectively generating an RF fingerprint that includes data indicative of at least one parameter associated with each of the received RF signals may include a means for selectively generating the RF fingerprint using at least one parameter from each of the plurality of received RF signals, each of the plurality of received RF signals within at least a portion of an RF spectrum that includes an IEEE 802.11 (WiFi) RF spectrum.

Example 27 may include elements of example 26 where the means for selectively generating the RF fingerprint using at least one parameter from each of the plurality of received RF signals may include a means for selectively generating the RF fingerprint using at least a unique identifier and a signal strength logically associated with each respective one of the received RF signals.

Example 28 may include elements of example 27 where the means for autonomously generating a proposed semantic label for logical association with the physical subdivision based at least in part on the RF fingerprint and the environmental signature included in the data cluster may include a means for generating a human perceptible output that includes data indicative of the proposed semantic label; a means for receiving an input indicative of a confirmation of the proposed semantic label; and a means for logically associating the confirmed semantic label with the physical subdivision responsive to receiving the input indicative of the confirmation of the semantic label.

Example 29 may include elements of example 28 where the means for generating a signal that includes data or information indicative of an ambient environment in a physical subdivision external to the system may include a means for generating a signal that includes data or information indicative of an ambient environment that includes at least one of: an ambient audible event, an ambient light event, an ambient motion event, or an image of the ambient environment.

Example 30 may include elements of example 29, and may additionally include a means for selecting a device profile based at least in part on the identified physical subdivision.

Example 31 may include elements of example 29, and may additionally include a means for detecting a presence of at least one other local portable electronic device; a means for receiving a signal from the at least one other local portable electronic device, the signal including data representative of a semantic label and an identified data cluster logically associated with the semantic label; a means for comparing the received data representative of the identified data cluster with the data cluster generated by the data grouping circuitry; and a means for, responsive to a favorable comparison, logically associating the received semantic label with the physical subdivision.

Example 32 may include elements of example 24 where the means for selectively generating an RF fingerprint that includes data indicative of at least one parameter associated with each of the received RF signals may include a means for selectively determining an RF signal sampling rate based at least in part on at least one of data or information included in an output signal from the sensor.

Example 33 may include elements of example 24 where the means for selectively generating an RF fingerprint that includes data indicative of at least one parameter associated with each of the received RF signals may include a means for selectively reducing the RF signal sampling rate responsive to data or information included in the output signal of the sensor indicative of the sensor being stationary.

Example 34 may include elements of example 24 where the means for selectively determining an RF signal sampling rate based at least in part on at least one of data or information included in an output signal from the sensor may include a means for selectively halting RF signal sampling responsive to data or information included in the output signal of the sensor indicative of the sensor being in motion.

According to example 35, there is provided a storage device that includes machine-readable instructions that, when executed by a circuit, cause the circuit to provide a semantic labeling controller, that selectively generates an RF fingerprint that includes data indicative of at least one parameter associated with each of the received RF signals; generates a signal that includes data or information indicative of an ambient environment in a physical subdivision external to the controller; generates an environmental signature that includes data indicative of the ambient environment external to the sensor; selectively groups, the RF fingerprint and the environmental signature into a data cluster responsive to the RF fingerprint meeting at least one threshold condition; and autonomously generates a proposed semantic label for logical association with the physical subdivision based at least in part on the RF fingerprint and the environmental signature included in the data cluster.

Example 36 may include elements of example 35 where the machine-readable instructions that cause the semantic labeling controller to selectively generate an RF fingerprint that includes data indicative of at least one parameter associated with each of the received RF signals further cause the semantic labeling controller to: selectively generate an RF fingerprint using at least one parameter from each of the plurality of received RF signals, each of the plurality of received RF signals within at least a portion of an RF spectrum that includes at least one of: a Bluetooth® RF spectrum or Near Field Communication (NFC) RF spectrum.

Example 37 may include elements of example 35 where the machine-readable instructions that cause the semantic labeling controller to selectively generate an RF fingerprint that includes data indicative of at least one parameter associated with each of the received RF signals further cause the semantic labeling controller to: selectively generate an RF fingerprint using at least one parameter from each of the plurality of received RF signals, each of the plurality of received RF signals within at least a portion of an RF spectrum that includes an IEEE 802.11 (WiFi) RF spectrum.

Example 38 may include elements of example 37 where the machine-readable instructions that cause the semantic labeling controller to selectively generate at least one RF fingerprint using at least one parameter from each of the plurality of received RF signals further cause the semantic labeling controller to: selectively generate at least one RF fingerprint using at least a unique identifier and a signal strength logically associated with each respective one of the plurality of received RF signals.

Example 39 may include elements of example 35 where the machine-readable instructions that cause the semantic labeling controller to autonomously generate a proposed semantic label for logical association with the physical subdivision based at least in part on the RF fingerprint and the environmental signature included in the data cluster further cause the semantic labeling controller to: generate a human perceptible output that includes data indicative of the proposed semantic label; receive an input indicative of a confirmation of the proposed semantic label; and logically associate the confirmed semantic label with the physical subdivision responsive to receiving the input indicative of the confirmation of the semantic label.

Example 40 may include elements of example 35 where the machine-readable instructions that cause the semantic labeling controller to generating an environmental signature that includes data indicative of the ambient environment external to the sensor further cause the semantic labeling controller to receive an environmental signature that includes data or information indicative of at least one of: an audible event external to the portable electronic device, an ambient light event external to the portable electronic device, an ambient motion event external to the portable electronic device, or an image of the environment external to the portable electronic device.

Example 41 may include elements of example 35, and may additionally include machine-readable instructions that cause the semantic labeling controller to select a portable electronic device profile based at least in part on the identified physical subdivision.

Example 42 may include elements of example 35, and may additionally include machine-readable instructions that cause the semantic labeling controller to: detecting a presence of at least one other local portable electronic device; receiving a signal from the at least one other local portable electronic device, the signal including data representative of a semantic label and an identified data cluster logically associated with the semantic label; comparing the received data representative of the identified data cluster with the data cluster generated by the data grouping circuitry; and responsive to a favorable comparison, logically associating the received semantic label with the physical subdivision.

Example 43 may include elements of example 35 where the machine-readable instructions that cause the semantic labeling controller to selectively generating at least one RF fingerprint using at least one parameter from each of the plurality of received RF signals sensor further cause the semantic labeling controller to selectively determine an RF signal sampling rate based at least in part on at least one of data or information included in an output signal from the sensor.

Example 44 may include elements of example 43 where the machine-readable instructions that cause the semantic labeling controller to selectively determining an RF signal sampling rate based at least in part on at least one of data or information included in an output signal from the sensor further cause the semantic labeling controller to selectively reduce the RF signal sampling rate, by the data grouping circuitry, responsive to data or information included in the output signal of the sensor indicative of the sensor being stationary.

Example 45 may include elements of example 43 where the machine-readable instructions that cause the semantic labeling controller to selectively determining an RF signal sampling rate based at least in part on at least one of data or information included in an output signal from the sensor further cause the semantic labeling controller to selectively halt RF signal sampling, by the data grouping circuitry, responsive to data or information included in the output signal of the sensor indicative of the sensor being in motion.

According to example 46, there is provided a system for autonomous semantic labeling of spaces, the system being arranged to perform the method of any of claims 13 through 23.

According to example 47, there is provided a chipset arranged to perform the method of any of claims 13 through 23.

According to example 48, there is provided at least one machine readable medium comprising a plurality of instructions that, in response to be being executed on a computing device, cause the computing device to carry out the method according to any of claims 13 through 23.

According to example 49, there is provided a device configured for autonomous labeling of spaces with semantic labels, the device being arranged to perform the method of any of claims 13 through 23.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A semantic labeling controller, comprising:
a transceiver to receive a plurality of radio frequency (RF) signals within a defined portion of the RF spectrum;
a sensor to generate a signal that includes data or information indicative of an ambient environment in a physical subdivision external to the controller;
RF fingerprint generator circuitry coupled to the transceiver, the RF fingerprint generator circuitry to receive a plurality of RF signals and selectively generate an RF fingerprint that includes data indicative of at least one parameter associated with each of the received RF signals;
environmental signature generator circuitry coupled to the sensor, the environmental signature generator circuitry to receive the signal that includes data or information indicative of the ambient environment in the physical subdivision and selectively generate an environmental signature that includes data indicative of the ambient environment external to the controller;
data grouping circuitry coupled to the RF fingerprint generator circuitry and to the environmental signal generator circuitry to selectively group the RF fingerprint and the environmental signature into a data cluster responsive to the RF fingerprint meeting at least one threshold condition; and
semantic labeling circuitry coupled to the data grouping circuitry to autonomously generate a proposed semantic label for logical association with the physical subdivision based at least in part on the RF fingerprint and the environmental signature included in the data cluster.

2. The semantic labeling controller of claim 1 wherein the transceiver, in operation, receives RF signals within at least a portion of an RF spectrum defined by Bluetooth® or Near Field Communication (NFC) standards.

3. The semantic labeling controller of claim 1 wherein the transceiver, in operation, receives RF signals within at least a portion of an RF spectrum defined by IEEE 802.11 (WiFi) standards.

4. The semantic labeling controller of claim 3 wherein the RF fingerprint generator circuitry selectively generates the RF fingerprint using at least a unique identifier and a signal strength logically associated with each respective one of the plurality of received RF signals.

5. The semantic labeling controller of claim 4 wherein the semantic labeling circuitry further:
generates a human perceptible output that includes data indicative of the proposed semantic label;
receives input indicative of a confirmation of the proposed semantic label; and
responsive to receipt of the input indicative of the confirmation of the proposed semantic label, logically associates the confirmed semantic label with the physical subdivision.

6. The semantic labeling controller of claim 5 wherein the sensor comprises at least one of: an audio input sensor, an ambient light sensor, an accelerometer, or an image sensor.

7. The semantic labeling controller of claim 6, further comprising device profile selection circuitry coupled to the semantic labeling circuitry to select a device profile based at least in part on the identified physical subdivision.

8. The semantic labeling controller of claim 6, further comprising device detection circuitry coupled to the semantic labeling circuitry and to the data grouping circuitry, the device detection circuitry to:
detect a presence of at least one other local portable electronic device;
receive a signal from the at least one other local portable electronic device, the signal including data representative of a semantic label and an identified data cluster logically associated with the semantic label;
compare the received data representative of the identified data cluster with the data cluster generated by the data grouping circuitry; and
responsive to a favorable comparison, logically associate the received semantic label with the physical subdivision.

9. The semantic labeling controller of claim 1 wherein the data grouping circuitry selectively determines an RF signal sampling rate based at least in part on at least one of data or information included in the output signal from the sensor.

10. The semantic labeling controller of claim 9 wherein the data grouping circuitry selectively reduces the RF signal sampling rate responsive to data or information included in the output signal of the sensor indicative of the sensor being stationary.

11. The semantic labeling controller of claim 9 wherein the data grouping circuitry further selectively halts RF signal sampling responsive to data or information included in the output signal of the sensor indicative of the sensor being in motion.

12. The semantic labeling controller of claim 1 wherein the data grouping circuitry selectively groups the RF fingerprint and the environmental signature into a data cluster responsive to the RF fingerprint remaining within an RF fingerprint threshold for greater than a defined temporal threshold period.

13. A semantic labeling method, comprising:
selectively generating, by radio frequency (RF) fingerprint generator circuitry, an RF fingerprint that includes data indicative of at least one parameter associated with each of the received RF signals;
generating, by a sensor, a signal that includes data or information indicative of an ambient environment in a physical subdivision external to the controller;
generating, by environmental signature generating circuitry coupled to the sensor, an environmental signature that includes data indicative of the ambient environment external to the sensor;

selectively grouping, by data grouping circuitry coupled to the RF fingerprint generator circuitry and to the environmental signal generator circuitry, the RF fingerprint and the environmental signature into a data cluster responsive to the RF fingerprint meeting at least one threshold condition; and autonomously generating, by semantic labeling circuitry coupled to the data grouping circuitry, a proposed semantic label for logical association with the physical subdivision based at least in part on the RF fingerprint and the environmental signature included in the data cluster.

14. The method of claim 13 wherein selectively generating an RF fingerprint that includes data indicative of at least one parameter associated with each of the received RF signals comprises:

selectively generating, by the RF fingerprint generator circuitry, an RF fingerprint using at least one parameter from each of the plurality of received RF signals, each of the plurality of received RF signals within at least a portion of an RF spectrum that includes at least one of: a Bluetooth® RF spectrum or Near Field Communication (NFC) RF spectrum.

15. The method of claim 13 wherein selectively generating an RF fingerprint that includes data indicative of at least one parameter associated with each of the received RF signals comprises:

selectively generating, by the RF fingerprint generator circuitry, an RF fingerprint using at least one parameter from each of the plurality of received RF signals, each of the plurality of received RF signals within at least a portion of an RF spectrum that includes an IEEE 802.11 (WiFi) RF spectrum.

16. The method of claim 15 wherein selectively generating at least one RF fingerprint using at least one parameter from each of the plurality of received RF signals comprises:

selectively generating, by the RF fingerprint generator circuitry, at least one RF fingerprint using at least a unique identifier and a signal strength logically associated with each respective one of the plurality of received RF signals.

17. The method of claim 13 wherein autonomously generating a proposed semantic label for logical association with the physical subdivision based at least in part on the RF fingerprint and the environmental signature included in the data cluster comprises:

generating, by the semantic labeling circuitry, a human perceptible output that includes data indicative of the proposed semantic label;

receiving, by the semantic labeling circuitry, an input indicative of a confirmation of the proposed semantic label; and logically associating, by the semantic labeling circuitry, the confirmed semantic label with the physical subdivision responsive to receiving the input indicative of the confirmation of the semantic label.

18. The method of claim 13 wherein generating an environmental signature that includes data indicative of the ambient environment external to the sensor comprises:

receiving, by a sensor, an environmental signature that includes data or information indicative of at least one of: an audible event external to the portable electronic device, an ambient light event external to the portable electronic device, an ambient motion event external to the portable electronic device, or an image of the environment external to the portable electronic device.

19. The method of claim 13, further comprising:

selecting, by device profile selection circuitry coupled to the semantic labeling circuitry, a portable electronic device profile based at least in part on the identified physical subdivision.

20. The method of claim 13, further comprising:

detecting, by device detection circuitry coupled to the semantic labeling circuitry and to the data grouping circuitry, a presence of at least one other local portable electronic device;

receiving, by the device detection circuitry, a signal from the at least one other local portable electronic device, the signal including data representative of a semantic label and an identified data cluster logically associated with the semantic label;

comparing, by the device detection circuitry, the received data representative of the identified data cluster with the data cluster generated by the data grouping circuitry; and responsive to a favorable comparison, logically associating, by the device detection circuitry, the received semantic label with the physical subdivision.

21. The method of claim 13 wherein selectively generating at least one RF fingerprint using at least one parameter from each of the plurality of received RF signals comprises:

selectively determining, by the data grouping circuitry, an RF signal sampling rate based at least in part on at least one of data or information included in an output signal from the sensor.

22. The method of claim 21 wherein selectively determining an RF signal sampling rate based at least in part on at least one of data or information included in an output signal from the sensor comprises:

selectively reducing the RF signal sampling rate, by the data grouping circuitry, responsive to data or information included in the output signal of the sensor indicative of the sensor being stationary.

23. The method of claim 21 wherein selectively determining an RF signal sampling rate based at least in part on at least one of data or information included in an output signal from the sensor comprises:

selectively halting RF signal sampling, by the data grouping circuitry, responsive to data or information included in the output signal of the sensor indicative of the sensor being in motion.

24. A storage device that includes machine-readable instructions that, when executed by a circuit, cause the circuit to provide a semantic labeling controller, that:

selectively generates an RF fingerprint that includes data indicative of at least one parameter associated with each of the received RF signals;

generates a signal that includes data or information indicative of an ambient environment in a physical subdivision external to the controller;

generates an environmental signature that includes data indicative of the ambient environment external to the sensor;

selectively groups, the RF fingerprint and the environmental signature into a data cluster responsive to the RF fingerprint meeting at least one threshold condition; and autonomously generates a proposed semantic label for logical association with the physical subdivision based at least in part on the RF fingerprint and the environmental signature included in the data cluster.

25. The method of claim 24, further comprising machine-readable instructions that cause the semantic labeling controller to:

detecting a presence of at least one other local portable electronic device;

receiving a signal from the at least one other local portable electronic device, the signal including data representative of a semantic label and an identified data cluster logically associated with the semantic label;

comparing the received data representative of the identified data cluster with the data cluster generated by the data grouping circuitry; and responsive to a favorable comparison, logically associating the received semantic label with the physical subdivision.

* * * * *